Feb. 11, 1941. H. H. CHESNY 2,231,154
METHOD OF REMOVING SOLUBLE IMPURITIES FROM MAGNESIUM HYDROXIDE
Filed Aug. 4, 1938 4 Sheets-Sheet 1
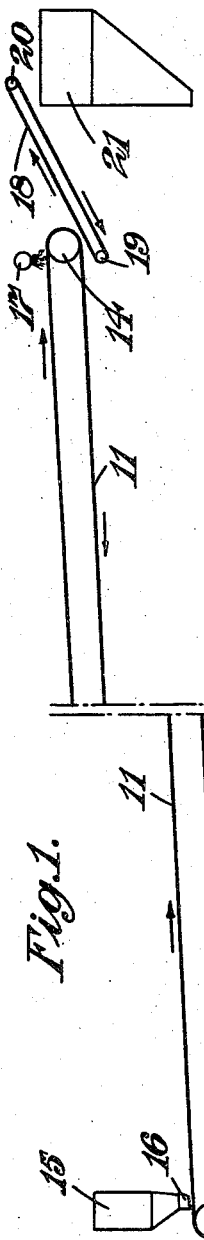
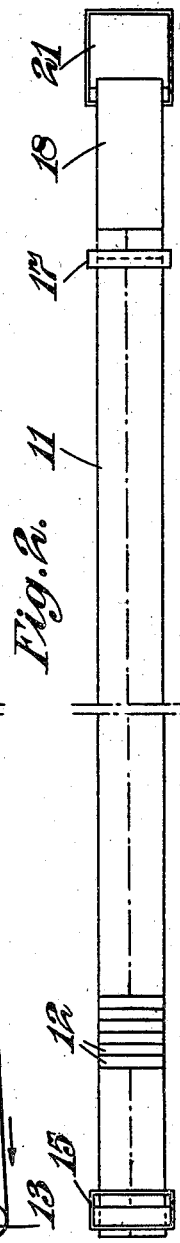
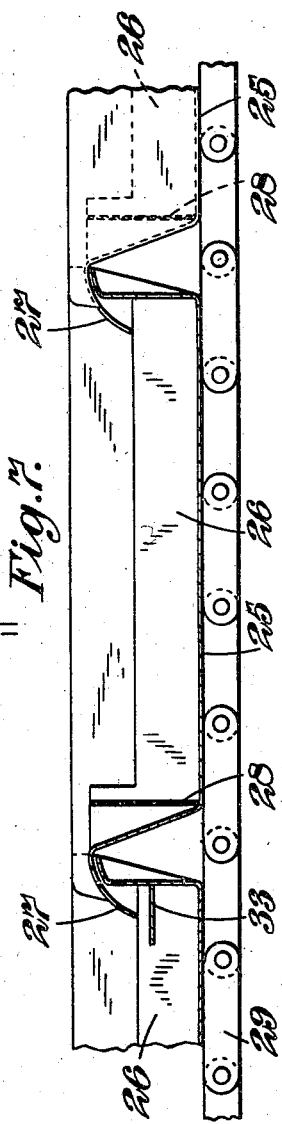
INVENTOR
HEINZ HENRY CHESNEY
By Stebbins, Blenko & Parmelee
ATTORNEYS Feb. 11, 1941.   H. H. CHESNY   2,231,154
METHOD OF REMOVING SOLUBLE IMPURITIES FROM MAGNESIUM HYDROXIDE
Filed Aug. 4, 1938   4 Sheets-Sheet 2
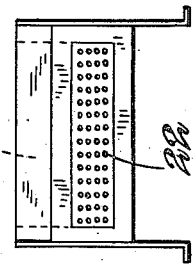
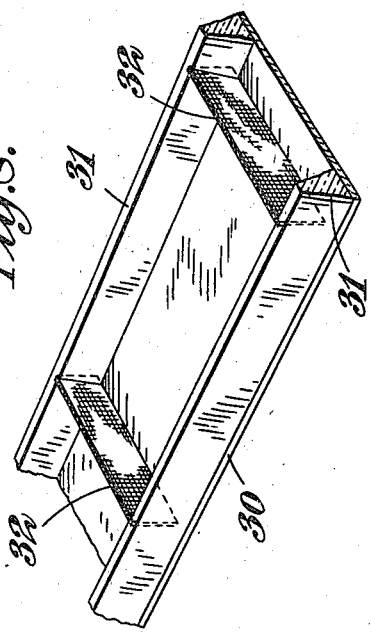
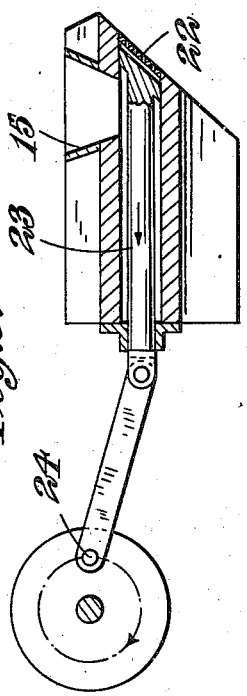
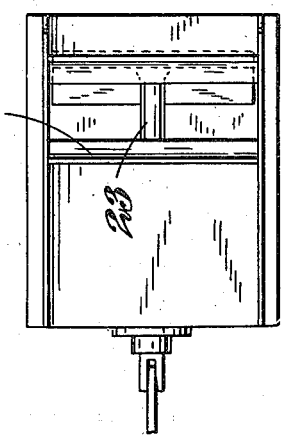
INVENTOR
HEINZ HENRY CHESNY
ATTORNEYS

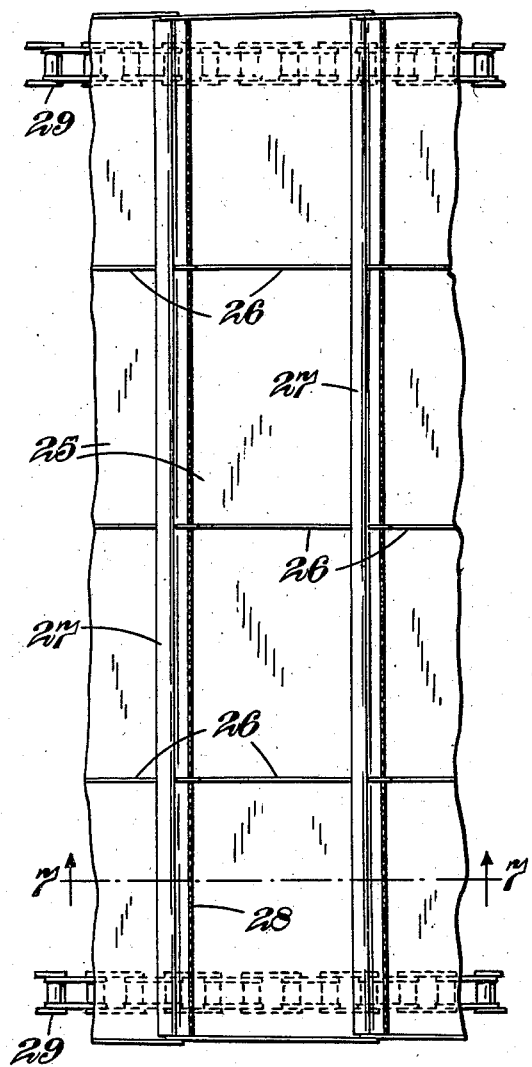

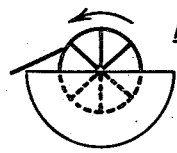
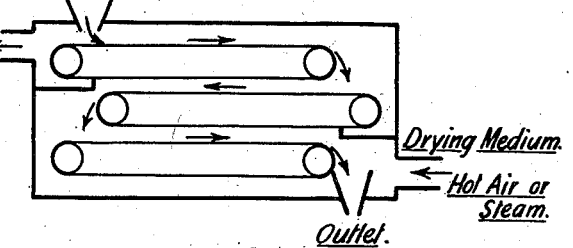
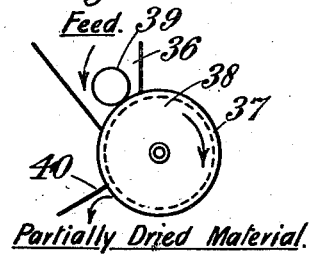
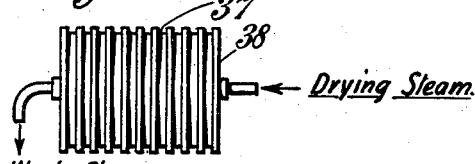
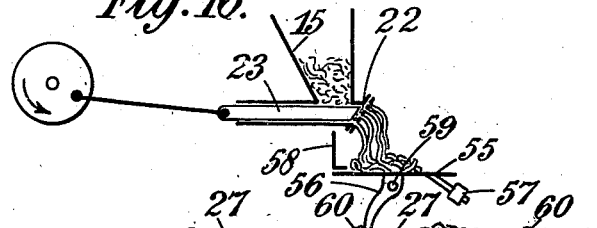
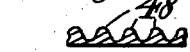
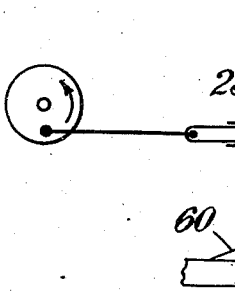
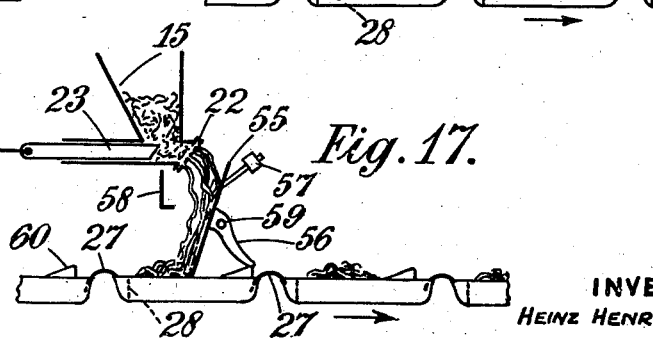

Patented Feb. 11, 1941

2,231,154

UNITED STATES PATENT OFFICE 2,231,154

METHOD OF REMOVING SOLUBLE IMPURITIES FROM MAGNESIUM HYDROXIDE

Heinz Henry Chesny, Worksop, England

Application August 4, 1938, Serial No. 223,133
In Great Britain August 19, 1937

13 Claims. (Cl. 23—310)

This invention comprises improvements in or relating to the removal of soluble impurities from solid substances and has particular reference to the removal of impurities from solid substances such as magnesium hydroxide which can be formed, while still wet from previous process steps, into pieces of definite shape.

The invention comprises a method of removing impurities from solids in the form of small masses which consists in supporting the solid on a moving conveyor while a solvent for the said impurities is caused to flow along the conveyor in a direction opposite to the direction of movement of said masses.

The invention may be applied with advantage to compact solid masses in the form of small rods, pellets or cakes, and in particular to precipitates which, if necessary, have been concentrated, e. g. by filtration or evaporation or both, so as to form a plastic material which can be moulded readily into compact masses. A concentrated sludge of a precipitate may be formed into small pieces by extrusion through perforated plates or by a process of moulding so as to expose a large surface area. Alternatively, the sludge may first be extruded and the extruded product may then be hardened by drying for example with hot air or steam.

The precipitate may conveniently be extruded through plates having perforations preferably 0.08 inch in diameter and spaced by about 0.1 inch between centres. This forms rods 0.08 inch in diameter and of varying lengths, the lengths depending upon the method of forcing the material through the plates. Although the rods may stick together longitudinally upon leaving the plate they subsequently separate when treated with the solvent.

The invention may be employed with particular advantage to the washing of a precipitate of magnesium hydroxide which has been concentrated to contain 30% to 48% $Mg(OH)_2$ and formed into rods, pellets or cakes. The washing process may be carried out at room temperature or at elevated temperature and it has been found that water at temperatures between 25° C. and 50° C. constitutes a good solvent for the impurities contained in the magnesium hydroxide. The layer of magnesium hydroxide rods, pellets or cakes may conveniently be ¾ inch to 2 inches thick.

The formation of the small masses of solid from a precipitate in the form of a sludge may conveniently be carried out by heating the concentrated sludge in moulds for example in serrations formed in the periphery of a drum.

The inclination of the conveyor may range between 1 in 15 and 1 in 30 in order to permit the downward flow of solvent at a suitable rate. When water is employed as the solvent its downward flow may vary between 2 to 8 gallons per minute per foot width of conveyor. Alternatively the rate of flow of the washing water down the conveyor may be between 4 and 16 feet per minute.

In the case of magnesium hydroxide rods, pellets or cakes containing 30% solids, it has been found that a suitable downward velocity of solvent is 7 feet per minute. When the downward velocity exceeds 12 feet per minute a certain amount of breaking up of the caked masses occurs unless the concentration of the solid is increased.

When the solid is in the form of rods, these may conveniently have a diameter between 0.04 inch and 0.12 inch.

The invention further includes apparatus for carrying out the method of removing impurities from solids described above and comprising a conveyor slightly inclined along its length, means for loading the conveyor at its lower end with small masses of the solid to be treated and means for admitting to the conveyor towards its upper end the solvent for the impurities.

The conveyor may conveniently be provided with a belt having upstanding side walls made for example of soft rubber and trapesium-shaped in cross-section in order to prevent the bending over of the side walls while the belt is passing around the end pulleys. Transverse partitions, made for example of wire gauze, may be arranged between the side walls of the conveyor belt. Alternatively the solid may be carried in a series of pans secured to the conveyor, the lower end of each pan being provided with a lip which overlaps the top edge of the pan next below it in series. The side and top walls of the pans are preferably of the same height and are higher than the lower end wall of the pan. They may conveniently be attached to roller chains and may be provided with wire screens near the lower end to facilitate the drainage of liquid from the solid. The screens may be of 0.06 inch to 0.13 inch mesh. This arrangement of apparatus can be used with solvents which would attack the rubber of a conveyor belt and has the advantage of retaining solvent in contact with the solid for a longer period. It has the further advantage that it permits of a greater submergence of the solid and a more efficient redistribution of the solvent at the entry to each pan, thus minimising or preventing solvent from running through the solid in channels. The distribution of solvent may be further improved by the provision of a splash plate at the upper end of each pan upon which the liquid leaving the adjacent pan in the series flows.

When the solid possesses sufficient mechanical strength the velocity of the solvent may be increased in the pan type of apparatus to produce a swirling motion of the solid within the pans, thus further increasing the efficiency of extraction of impurities.

At the upper end of the conveyor the residual solvent may be removed from the solid by depositing the wet solid on a draining conveyor which may be inclined at a relatively steep angle. This draining conveyor may be provided with ribs or screens arranged e. g. diagonally across the surface of the conveyor in order to retain the solid on the conveyor. The draining conveyor may consist of a rubber belt or of a series of flat metal trays which may be grooved so as to facilitate the removal of solvent from the solid. Scraper knives may be used to remove the solid from the draining conveyor.

The apparatus may consist of several conveyors in series with a draining belt arranged between successive conveyors of the series.

The apparatus further includes means for forming a paste of the material to be washed into small rod-like masses by extruding the paste through a perforated plate. The extrusion apparatus may conveniently be mounted over the lower end of the conveyor and the extrusion plate is preferably inclined to the horizontal so as to facilitate the separation of the rods from the plate.

Following is a description by way of example and with reference to the accompanying diagrammatic drawing of two methods of carrying the invention into effect.

In the drawings:

Figure 1 is a side elevation of a washing and draining conveyor with its associated feed apparatus, Figure 2 is a plan view of the washing and draining conveyor shown in Figure 1, Figure 3 is a side elevation partly in section of one form of extrusion press, Figure 4 is a front view of the end of the extrusion press shown in Figure 3, Figure 5 is a plan view of the extrusion press, Figure 6 is a plan view on a larger scale of one of the pans of the conveyor shown in Figures 1 and 2, Figure 7 is a side elevation partly in section and on an enlarged scale taken on the line 7—7 of Figure 6 looking in the direction of the arrows, Figure 8 is a perspective view of an alternative form of conveyor, Figure 9 represents in purely diagrammatic form the concentration of the precipitate by filtration using a rotary suction roll dipping into a trough of the precipitate, the dried material being scraped off the roll towards the end of each revolution, Figure 10 illustrates the partial drying of the precipitate by hot air or steam which is admitted at the bottom of a chamber as shown and is withdrawn from the top while the precipitate passes downwardly through the chamber on a series of conveyors.

Figure 11 is a side view illustrating the formation of small masses of a precipitate by feeding the precipitate while wet from a hopper 36 into circumferential grooves 37 on the periphery of steam-heated drum 38 rotated in the direction of the arrow, the precipitate being pressed into the grooves by the roller 39 and the partially dried solid removed by a scraper 40, Figure 12 is an elevation of the roller shown in Figure 11, Figure 13 shows in diagrammatic form an arrangement in which conveyors 41, 42 and 43 are employed in conjunction with draining conveyors 44, 45 and 46.

Figure 14 shows a portion of a belt for a draining conveyor which is provided with upstanding ribs 48 and Figure 15 is a section on the line A—A' in Figure 14. The ribs 48 may, if desired, be increased in height and provided with perforations extending in the direction of the length of the conveyor to form screens and in this construction the ribs are preferably spaced substantial distances apart.

Figures 16 and 17 show two positions of one form of device for preventing the extruded material from falling on to the transverse screens of the conveyor or from entering the space between the screen and the lower lip of the pans. This device consists of a pivoted shield plate 55 which shields the screen 28 or the space between the screen 28 and the lower lip 27 of a pan while beneath the extrusion apparatus. The shield 55 is provided with a lever 56 which engages with cams 60 attached to the pans. A fixed stopplate 58 and a counter weight 57 are provided to maintain the shield 55 in a normally horizontal position. When the open portion of a pan is located centrally below the shield, the cam 60 engages the lever thereby tilting the shield 55 into the position shown in Figure 17 and thus dumping the extruded rods which have collected on the shield into the pan.

Similar reference numerals denote similar parts through the figures of the drawings.

Referring to Figures 1, 2, 6, 7 and 8, 11 is a conveyor inclined to the horizontal. 12 are pans or compartments on the conveyor. 13 and 14 are the end rollers of the conveyor. 15 is a hopper for the material to be treated and 16 a device for forming the material into rods, pellets or cakes. 17 is a pipe for distributing a stream of solvent upon the conveyor, 18 is a draining conveyor running around end pulleys 19 and 20, and 21 is a hopper to receive the washed and drained material.

Referring to Figures 3, 4 and 5, 22 is an extrusion plate for forming a paste into rods and 23 is a plunger driven by a crank 24 for forcing the paste through the plate.

Referring to Figures 6 and 7, 25 are pans secured to the conveyor, 26 are vertical partitions dividing the pans into compartments, 27 is a lip at the lower end of each pan overlapping the upper end of the pan next below it in the series, and 28 is a wire gauze screen near the lower end of each pan. The pans are supported on chains 29.

In Figure 8 a conveyor belt 30 is provided with upstanding side walls 31 and transverse wire screens 32.

Example I

Crystalline precipitated magnesium hydroxide may be washed in accordance with the present invention by concentrating the slurry originally containing 12% of magnesium hydroxide as the solid phase together with dissolved alkali and alkali earth chlorides and sulphates in the liquid phase, the chlorides expressed as NaCl amounting to 3.9%, to form a sludge containing 33.7% $Mg(OH)_2$ and 2.45% NaCl, i. e. 6.8% NaCl calculated on the dry basis. The sludge was formed into small rods by extrusion in extrusion apparatus shown in Figures 3, 4 and 5 of the drawings, the sludge being fed from the feed hopper 15 into the compression chamber where it is forced by the plunger 23 through the inclined extrusion plate 22. The inclination of the extrusion plate and the corresponding inclination of the plunger 23 assist the passage of the sludge into the compression chamber and the removal of the extruded rods from the plate.

The extruded material is deposited directly into the series of pans 25 to form a layer ¾ inch to 1¾ inches in thickness secured to a pair of roller chains 29 (Figure 7).

Water at a temperature of about 30° C. is flowed into the pans at the upper end of the belt 16 through a distributing pipe 17 and flows from pan to pan down the conveyor. The amount of water is between 0.3 and 1 cubic foot per minute per foot width of the pans and this produces (with a conveyor rising 1 foot in 20 feet) a flow of water down the conveyor at a rate of about 7 feet per minute. Even distribution of the water entering a pan may be ensured by means of splash plates 33 (see Figure 7). At the upper end of the conveyor the washed solid is deposited on a drying conveyor 18 which is inclined at a greater angle than the conveyor 11. The drained solid is finally deposited in the hopper 21. During the dumping of the washed solid onto the conveyor 18 from the upper pan 25 as it passes around the upper roller or pulley 14 of the conveyor, the water in the pan passes through the slit, over the leading end of the pan and under the lip 27 on the trailing end of the pan in advance thereof and is discharged laterally from between the two pans, while the solids pass over the lip 27 onto the conveyor 18.

*Example II*

In an alternative method of washing crystalline precipitated magnesium hydroxide of the composition described in Example I, the crystalline magnesium hydroxide sludge containing between 32% and 48% solids is extruded through a plate having holes 0.08 inch in diameter on to the lower end of a conveyor belt 30 (Figure 8) moving in an upward direction and rising 1 foot in 20 feet, the rate of extrusion being such as to give a layer 1¼ to 1¾ inches in thickness. The belt 30, which is 1 foot wide and consists of a canvas inserted rubber belt, is provided with vulcanised sides 31, 2 inches to 4 inches in height, the sides being broader at the base than at the top, and is sprayed towards its upper end with softened water at a temperature of 40° C. at a rate of 4.5 gallons per minute. This produces a flow of water down the belt at a rate of about 7 feet per minute.

In order to check any tendency for material to be washed towards the bottom of the belt by the flow of water transverse wire gauze screens 32 having a mesh of 1/16 to 1/8 inch are provided at intervals of 2 feet.

The belt is carried by two chains (not shown) carrying angle bars at suitable intervals to which the belt is attached. Suitable driving sprockets are provided at one or both of the ends of the conveyor.

Treatment of the extruded mass with water by the method and with the apparatus described above resulted in the reduction in the proportion of sodium chloride to 1.6% after 10 minutes' washing, to 0.4% after 30 minutes' washing, to 0.2% after 60 minutes' washing and to 0.1% after 120 minutes' washing.

I claim:

1. A method of removing soluble impurities from crystalline magnesium hydroxide which comprises forming the material while in the plastic state into small, readily dispersible but self-supporting discontinuous masses, supporting the said masses and moving said support and said masses in one direction, and at the same time causing a solvent for the said impurities to flow in the opposite direction along said support in contact with the masses in sufficient quantity and at a sufficient rate of flow to dissolve a substantial proportion of the impurities during the travel of said masses.

2. A method of removing soluble impurities from crystalline magnesium hydroxide which comprises forming the material while in the plastic state into small, readily dispersible but self-supporting discontinuous masses, supporting the said masses and moving said support and the masses upwardly in an inclined plane, and at the same time causing a solvent for said impurities to flow downwardly along said support in said plane in contact with the masses in sufficient quantity and at a sufficient rate of flow to dissolve a substantial proportion of the impurities during the upward travel of said masses.

3. A method of removing soluble impurities from crystalline magnesium hydroxide which comprises forming the material while in the plastic state into small, readily dispersible but self-supporting discontinuous masses, supporting the said masses and moving the support and the masses in one direction, and at the same time causing a solvent for the impurities to flow along said support in the opposite direction in contact with the masses in controlled quantities and at a sufficient rate of flow to dissolve a substantial proportion of the impurities during the travel of said masses.

4. A method of removing soluble impurities from a precipitate of crystalline magnesium hydroxide which comprises concentrating the precipitate until it reaches the plastic state and contains approximately 30 to 48% magnesium hydroxide, forming the precipitate while in the plastic state into small, readily dispersible but self-supporting discontinuous masses, supporting the said masses and moving the support and the masses in one direction, and at the same time causing controlled amounts of a solvent for the impurities to flow in the opposite direction along said support in contact with the masses in sufficient quantity and at a sufficient rate of flow to dissolve a substantial proportion of the impurities during the travel of said masses on said support.

5. A method of removing soluble impurities from crystalline magnesium hydroxide which comprises forming the material while in the plastic state into small, readily dispersible but self-supporting masses, supporting the said masses on a conveyor and moving the conveyor and said masses in one direction, and at the same time causing controlled amounts of a solvent for the impurities at a temperature of approximately 25° C. to 50° C. to flow along said support in contact with the said masses in sufficient quantity and at a sufficient rate of flow to dissolve a substantial proportion of the impurities during the travel of said masses.

6. A method of removing soluble impurities from crystalline magnesium hydroxide which comprises forming the material while in the plastic state into small, readily dispersible but self-supporting masses, supporting the said masses and moving said support and said masses upwardly in an inclined plane and at the same time causing controlled amounts of a solvent for the impurities at a temperature of approximately 25° C. to 50° C. to flow downwardly along said support in contact with the said masses in sufficient quantity and at a sufficient rate of flow to dissolve a substantial proportion of the impurities during the travel of said masses.

7. A method of removing soluble impurities from crystalline magnesium hydroxide which comprises forming the material while in the plastic state into small, readily dispersible but self-supporting discontinuous masses, supporting the said masses on a conveying mechanism in a layer approximately 2 cm. to 5 cm. in thickness, moving the conveying mechanism and the masses thereon in one direction, and at the same time causing a solvent for the impurities to flow in the opposite direction along said conveying mechanism in contact with the masses in sufficient quantity and at a sufficient rate of flow to dissolve a substantial proportion of the impurities during the travel of said masses.

8. A method of removing soluble impurities from a precipitate of crystalline magnesium hydroxide which comprises forming the material while in the plastic state into small, readily dispersible but self-supporting discontinuous masses containing approximately 30% to 48% magnesium hydroxide, supporting the said masses on conveying mechanism in a layer approximately 2 cm. to 5 cm. in thickness, moving the conveying mechanism and the masses thereon in one direction, and at the same time causing a solvent for the impurities at a temperature of approximately 25° C. to 50° C. to flow in the opposite direction along said conveying mechanism in contact with the masses in sufficient quantity and at a sufficient rate of flow to dissolve a substantial proportion of the impurities during the travel of said masses.

9. A method of removing soluble impurities from crystalline magnesium hydroxide which comprises forming the material while in the plastic state into small, readily dispersible but self-supporting discontinuous masses, supporting the said masses on an inclined, upwardly moving conveyor, moving the conveyor and said masses upwardly, and at the same time causing a solvent for the impurities to flow downwardly along the conveyor in contact with the masses in an amount between 0.14 and 0.5 meter per second per 0.3 meter of width of the conveyor.

10. A method of removing soluble impurities from an agglomerate containing crystalline magnesium hydroxide comprising forming the material while in the plastic state into small, readily dispersible but self-supporting discontinuous masses, supporting the said small masses, moving the support and said masses upwardly in an inclined plane, and at the same time causing a solvent for the said impurities to flow downwardly along the support in said plane in contact with the small masses in a stream moving at the rate of between 1.2 and 3.6 meters per minute and in sufficient quantity to dissolve a substantial proportion of the impurities during the travel of said masses.

11. A method of removing soluble impurities from crystalline magnesium hydroxide which comprises forming the material while in the plastic state into small, readily dispersible but self-supporting discontinuous rods approximately 1 mm. to 3 mm. in diameter, supporting the rods and moving the support and said rods upwardly in an inclined plane, and at the same time causing a solvent for the impurities to flow downwardly along said support in said plane in contact with the masses in sufficient quantity and at a sufficient rate of flow to dissolve a substantial proportion of the impurities during the upward travel of said rods.

12. A method of removing soluble impurities from an agglomerate containing crystalline magnesium hydroxide which comprises forming the material while in the plastic state into small, readily dispersible but self-supporting discontinuous masses, supporting the said small masses while in the plastic state in a series of pans secured to an inclined, upwardly moving conveyor, causing a solvent for the said impurities to flow down the conveyor in contact with the said small masses by overflowing from the lower end of one pan into the upper end of the pan next below it in the series, the rate of flow of the solvent being such that the masses are not substantially disintegrated and the quantity of solvent being sufficient to dissolve a substantial proportion of the impurities.

13. A method of removing soluble impurities from an agglomerate containing crystalline magnesium hydroxide which comprises forming the material while in the plastic state into small, readily dispersible but self-supporting discontinuous masses, supporting the small masses in compartments formed on a conveyor, moving the conveyor and the masses thereon upwardly along an inclined plane, and at the same time causing a solvent for the impurities to flow downwardly along the conveyor from one compartment to another in contact with the plastic masses, the quantity and rate of flow of the solvent being sufficient to dissolve a substantial proportion of the impurities during the upward travel of said masses.

HEINZ HENRY CHESNY.